United States Patent
Fong et al.

(10) Patent No.: US 11,954,468 B2
(45) Date of Patent: Apr. 9, 2024

(54) AIML-BASED CONTINUOUS DELIVERY FOR NETWORKS

(71) Applicant: EMC IP Holding Company LLC, Hopkinton, MA (US)

(72) Inventors: Victor Fong, Medford, MA (US); Malini Bhattacharjee, Cupertino, CA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

(21) Appl. No.: 17/443,041

(22) Filed: Jul. 20, 2021

(65) Prior Publication Data

US 2023/0022050 A1 Jan. 26, 2023

(51) Int. Cl.
*G06F 8/60* (2018.01)
*G06F 11/36* (2006.01)
*G06N 5/04* (2023.01)
*G06N 20/00* (2019.01)
*H04L 67/10* (2022.01)

(52) U.S. Cl.
CPC ............ *G06F 8/60* (2013.01); *G06F 11/3688* (2013.01); *G06N 5/04* (2013.01); *G06N 20/00* (2019.01); *H04L 67/10* (2013.01); *G06F 11/3664* (2013.01)

(58) Field of Classification Search
CPC .... G06F 8/60; G06F 11/3688; G06F 11/3644; G06N 20/00; H04L 67/10
USPC .............. 717/124–140, 168–174; 706/45–52
See application file for complete search history.

(56) References Cited

U.S. PATENT DOCUMENTS

| | | | | |
|---|---|---|---|---|
| 7,490,073 | B1 * | 2/2009 | Qureshi ................. | G06N 5/048 706/56 |
| 7,865,888 | B1 * | 1/2011 | Qureshi ................. | G06N 5/048 717/170 |
| 7,900,201 | B1 * | 3/2011 | Qureshi ................. | G06N 5/048 717/124 |
| 9,460,401 | B2 * | 10/2016 | Zeng ...................... | G06N 3/084 |
| 9,489,837 | B1 * | 11/2016 | ElHilali ................. | G08C 19/00 |
| 9,876,703 | B1 * | 1/2018 | Arllen .................... | H04L 43/55 |
| 10,346,284 | B1 * | 7/2019 | Yang ....................... | G06F 8/34 |
| 10,423,469 | B2 * | 9/2019 | Kolodzieski .............. | G06F 8/70 |
| 10,440,577 | B1 * | 10/2019 | Vasseur .................. | H04W 48/02 |
| 10,628,283 | B2 * | 4/2020 | Tatikonda ............ | G06F 11/0751 |
| 10,810,501 | B1 * | 10/2020 | Kimchi .................... | G06N 5/04 |
| 10,997,494 | B1 * | 5/2021 | Ng .......................... | A63F 13/75 |
| 11,082,525 | B2 * | 8/2021 | Sethuraman .......... | H04L 63/123 |
| 11,126,731 | B1 * | 9/2021 | Thomas .............. | G06F 11/3692 |
| 11,438,211 | B1 * | 9/2022 | Lyubomirsky ...... | H04L 41/0654 |

(Continued)

OTHER PUBLICATIONS

Gagne et al, "Analysis of Telemetry Data from a Real-Time Strategy Game: A Case Study", ACM, pp. 1-24 (Year: 2012).*

(Continued)

*Primary Examiner* — Anil Khatri
(74) *Attorney, Agent, or Firm* — Workman Nydegger (57) ABSTRACT

One example method includes deploying an application in a distributed computing environment. Telemetry data is collected that corresponds with the deployment of an application. The telemetry data is received by a machine learning model that was trained with test telemetry data to determine whether the deploying is successful or failed. A successful inference results in continued deployment and a fail inference results in a rollback of the application.

16 Claims, 3 Drawing Sheets

(56) References Cited

U.S. PATENT DOCUMENTS

| | | | | |
|---|---|---|---|---|
| 11,537,378 B2* | 12/2022 | Demarne | ............... | G06F 9/5027 |
| 11,556,815 B1* | 1/2023 | Stave | ..................... | G06N 20/20 |
| 11,669,315 B2* | 6/2023 | Harwood | ............ | G06F 11/3692 |
| | | | | 717/124 |
| 11,762,649 B2* | 9/2023 | Liao | ........................ | G06F 9/542 |
| | | | | 717/168 |
| 2019/0319977 A1* | 10/2019 | Gottschlich | ............ | G06F 18/214 |
| 2020/0351173 A1* | 11/2020 | Vasseur | ................... | H04L 41/16 |

OTHER PUBLICATIONS

Hohemberger et al, "Orchestrating In-Band Data Plane Telemetry With Machine Learning", IEEE, pp. 2247-2251 (Year: 2019).*

Shipunov et al, "Trusted Transport Telemetry by Using Distributed Databases", IEEE, pp. pp. 344-347 (Year: 2019).*

Sivanathan et al, "Managing IoT Cyber-Security Using Programmable Telemetry and Machine Learning", IEEE, pp. 60-74 (Year: 2020).*

Sutariya et al, "Managing IoT Cyber-Security Using Programmable Telemetry and Machine Learning", IEEE, pp. 1323-1328 (Year: 2023).*

Putina et al, "Telemetry-based stream-learning of BGP anomalies", ACM, pp. 15-20 (Year: 2018).*

* cited by examiner

AIML-BASED CONTINUOUS DELIVERY FOR NETWORKS

FIELD OF THE INVENTION

Embodiments of the present invention generally relate to distributed applications and related operations. More particularly, at least some embodiments of the invention relate to systems, hardware, software, computer-readable media, and methods for continuous delivery and software development in a highly distributed heterogeneous computing environment.

BACKGROUND

Advancing technology provides both opportunities and challenges. Technologies such as 5G and multi-access edge (MEC) computing has changed the way that workloads are performed. For example, instead of end-to-end systems provided by network equipment providers (NEPs), public and private 5G providers can plug and play solutions from different vendors in addition to implementing their own solutions.

This is occurring in part because network functions are becoming software defined. Network functions are being virtualized to take advantage of the benefits such as efficient resource usage. Instead of integrating with specific hardware models, virtual network functions use standard development kits (SDKs).

These changes complicate the process or rolling out new software. More specifically, continuous delivery in the cloud is performed largely because the software may de deployed across a few data centers. Using continuous delivery across a few data centers, however, is distinct from rolling out software across potentially thousands of clusters in thousands geographic locations. For example, monitoring traffic to identify unexpected behavior is difficult. Deploying an application in this environment is challenging. If a problem with the application deployment is detected, rolling back to an older version of an application is even more difficult in a distributed environment.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Embodiments of the present invention generally relate to continuous delivery in distributed computing environments. More particularly, at least some embodiments of the invention relate to systems, hardware, software, computer-readable media, and methods for deploying software in heterogeneous computing environments. Embodiments of the invention further relate to determining and performing geographical, topological and policy driven deployment plans, automatically identifying expected or unexpected behavior in application deployment, and automatically performing rollback operations when necessary.

Artificial intelligence (AI) or machine learning (ML) models are, in one example, algorithms that are trained using training data sets, ML models can help make decisions and often generate inferences or insights. For example, the process of testing an application during development may include testing the deployment in an environment that simulates at least a portion of the production environment. Embodiments of the invention use telemetry data or time series data generated during testing to train an ML model. The inference of the ML model may indicate whether the deployment is proceeding as expected or whether the deployment is not proceeding as expected. Once trained, telemetry data or time series data associated with the deployment of the application to the production environment allows the deployment to be monitored automatically and allows unexpected conditions or circumstances to be quickly identified. Embodiments of the invention use AI/ML models (referred to herein as ML models) to monitor and detect problems when rolling out a new application, an update, or the like. This also allows remedial actions to be taken, such as rolling back an application to a previous version when necessary. Because the unexpected conditions can be detected quickly, the impact of a deployment or other problem on the service being provided can be reduced if not minimized.

More specifically, embodiments of the invention relate to deploying applications or other software in a heterogeneous or distributed computing environment. A distributed computing environment includes, by way of example only and not limitation, a computing environment where workloads may be distributed. The distributed computing network can include aspects of telecommunication networks in addition to other networks. A distributed computing environment may include different networks that are connected to each other. Workloads can be processed centrally, at the edge of the network, or the like.

This allows workloads to be performed in cloud environments such as data centers, base stations, edge devices and systems and systems in between. A distributed computing environment is one in which coordinated tasks are performed on multiple computers simultaneously or working together. A distributed computing environment may include distributed units, computers, edge computers, base stations, user devices, edge datacenters, central units, multi-access edge computing, data centers, cell towers, switches, cloud environments, and the like or any combination thereof. Workloads are distributed across and performed in these networks.

Due to this complexity, deploying a new application or an update can be complicated for a variety of reasons which include the different types of network connections, different providers, different components, and the like.

Figure 1:
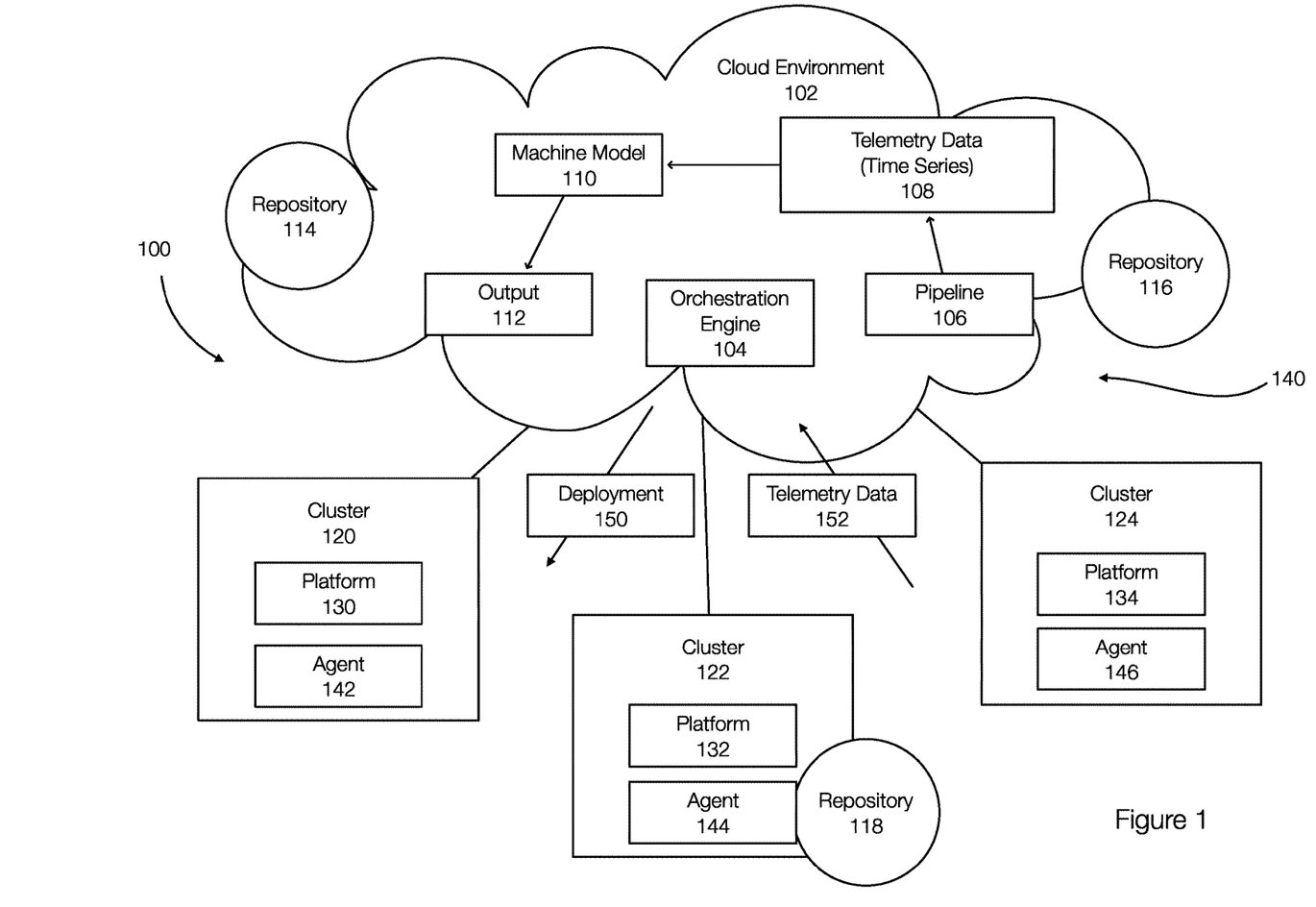
FIG. 1 discloses aspects of a distributed computing environment.

FIG. 1 illustrates an example of a heterogeneous computing environment or a distributed computing environment. FIG. 1 illustrates a distributed computing environment 100 that includes, by way of example only, a cloud 102. The cloud 102 is representative of a datacenter or of multiple datacenters and represents centralized computing. The clusters 120, 122, and 124 represent decentralized computing components such as edge stations, base stations, server computers, or the like. Typically, the compute power of clusters is less than the compute poser of the cloud 102. However, the clusters are typically closer to the end user.

The clusters 120, 122, and 124 may be a collection of servers or other compute resources (e.g., an edge or base station or other edge device). The computing environment 100 also represents telecommunication networks, local area networks, wide area networks, the internet, or the like or combination thereof. The computing environment 100 may cover a large geographic area (e.g., a country, state, city) or smaller geographic areas. In addition, the clusters 120, 122, and 124 may represent thousands of distributed sites. Each of the clusters 120, 122, and 124, however, may be viewed as a computing entity in at least one example.

The computing environment 100 is thus complex from a network perspective, from a geographic perspective, and the like. Embodiments of the invention automate and coordinate delivering an application in the computing environment 100. Embodiments of the invention further allow the impact of interoperability on application deployment to be considered during deployment.

Because deployment to a production environment such as the computing environment 100 may have unexpected or unpredictable complications or conditions, embodiments of the invention are able to monitor the deployment and perform a rollback operation if necessary.

When rolling out a new application, an update, a new version, or the like, embodiments of the invention can coordinate the deployment across the computing environment 100. In addition, embodiments of the invention can isolate problems during deployment to minimize impact of these problems. A rollback can be performed quickly to minimize disruptions. Further, rollback operations and roll out operations can be performed in a planned manner and be limited to specific geographic areas, clusters, or other units.

In one example, the continuous deployment platform 140 includes an orchestration engine 104 and an agent or agents 142, 144, and 146. An agent may deployed to each cluster. FIG. 1 illustrates agents 142, 144, and 146 running in, respectively, to clusters 120, 122 and 124. The orchestration engine 104 and/or the agents 142, 144, 146 can automate deployment of new software or updates across large numbers of clusters, generate a geographical, topological and policy-driven deployment plant, automatically identify expected or unexpected behavior, and/or automate a roll back operation when necessary.

In one example, a container may be used as a deployment unit. For example, an application may be deployed as a container. However, embodiments of the invention may be implemented using containers, virtual machines, bare-metal machines, or the like or combination thereof.

As illustrated in FIG. 1, a container (or virtual machine) platform 130, 132, and 134 are present and operating in the clusters 120, 122, and 124. The orchestration engine 104 is deployed to a cloud environment 102 (e.g., in a server or set of servers in a datacenter) and is accessible by each of the clusters 120, 122, and 124 (or by the corresponding agents 142, 144, and 146). In this example, one or more repositories (repository 114, 116, and 118) for storing container or virtual machine images are present in the computing environment 100 and are available to each of the clusters 120, 122, and 124.

The topology of the clusters 120, 122, and 124 may have been defined by the orchestration engine 104. Automation may be used to generate the topology, which may be represented by a topology graph.

FIG. 1 further illustrates aspects of a workflow related to application deployment, application monitoring during deployment, rollback operations, and the like. In one example, an application or other software may be developed using a continuous integration continuous (CI/CD) pipeline 106, which is a method for developing and delivering an application (e.g., a new application, an update, or the like).

Part of the pipeline 106 includes testing. In other words, once an application (or portion thereof) is ready for production, the application is typically tested in the pipeline 106. As a result, testing may include deploying the application to a system that is configured to represent the computing environment 100 (the production environment) in which the application will ultimately be deployed. During testing, telemetry data 108 may be generated. The telemetry data 108 may include runtime traffic data, HTTP request/response times and status codes, resource consumption, resource access, and the like. This telemetry data 108, which may include time series data, is used by the orchestrator engine 104 to train a machine model 110. In one example, the telemetry data 108 may relate to deployment aspects. Thus, the output 112 is an inference regarding the action of deploying the application. However, operation of the application for its intended purpose may also be considered or input to the machine model 110. Thus, deployment may include ensuring that the application operates as expected after installation. The output 112 of the machine model 110 may include an inference or insight regarding the test deployment. The output 112 may indicate that the testing is as expected or that unexpected things are happening.

During deployment 150 of the application to the production environment—the computing environment 100 (e.g., the clusters 120, 122, and 124)—similar telemetry data 152 is generated. As a result, the machine model 110 can determine whether or not the deployment is within expectations or whether unexpected conditions are occurring based on the telemetry data generated during deployment to the computing environment 100.

The machine model 110 allows unexpected conditions or problems to be detected much earlier compared to conventional deployment operations and allows corresponding actions to be taken. For example, a rollback operation to a previous version may be performed. Embodiments of the invention may thus minimize any service disruptions.

Figure 2:
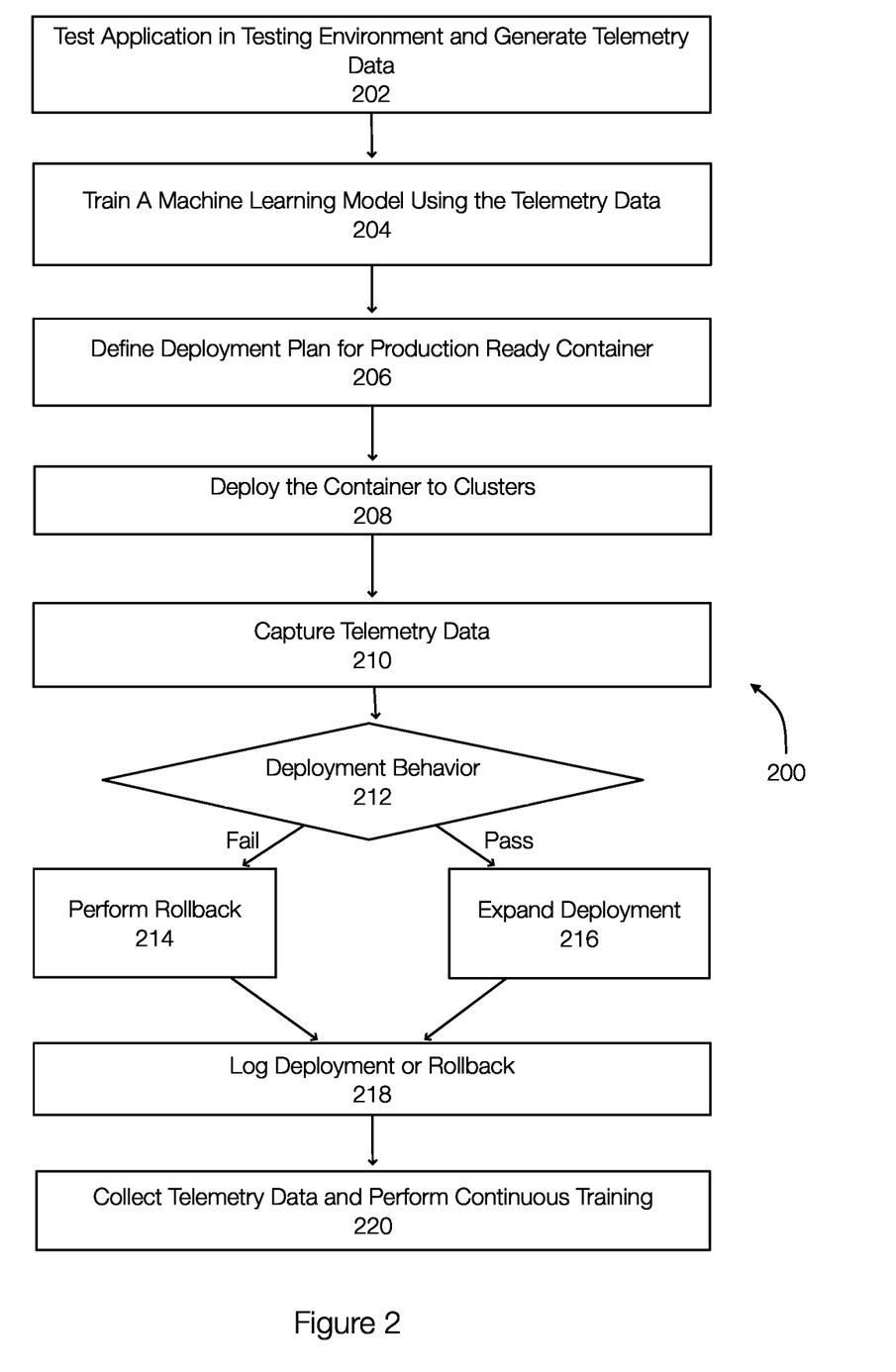
FIG. 2 discloses aspects of performing deployment/rollback operations in a distributed computing environment.

FIG. 2 illustrates an example of a deployment workflow in a computing environment. The elements illustrated in the method 200 can be performed in different orders. Further, each element of the method 200 may be an independent method. Some aspects of the method 200 may be omitted or may be performed separately. For example, deployment or rollback may occur in stages, by geographic area, by cluster, or the like.

Initially, when a new application (or update or version) is being developed, the application is tested and telemetry data is generated 202 from the testing. In addition to capturing telemetry data such as runtime traffic data, HTTP request and response status codes, resource consumption, resource access, or the like, the success or failure of the test may be included in the telemetry data. The telemetry data collected during testing serves as training data.

Thus, a machine learning model is trained 204 using the training data or the telemetry data and the machine learning model can learn to distinguish between a successful operation (e.g., deployment) or a failed operation that may require remediation such as rollback. The output or inference is whether the application and/or the deployment thereof is behaving correctly as intended. Automated machine learning (AutoML) engines can be used to automate the model creation.

Once an application is tagged, a container image may be submitted to a container repository and marked as production ready. This allows a deployment plan to be developed 206. The deployment plan may include deploying containers individually or in groups. The deployment methodology may also be determined. A Blue Green deployment may be performed. Containers may be marked for deployment in specific environments marked in the topology. For example, some containers may be intended for a cluster while another container may be intended for a different topology. The deployment plan may be defined such that the application is incrementally deployed across geographical locations. Human checkpoints may also be defined. This allows, in part, the deployment to be checked and may help address unknown conditions about certain environments.

Once the deployment plan is defined (or if the deployment plan already existed), the orchestration engine may deploy 208 the application. For example, the orchestration engine and/or the agents may cooperate to distributed the production containers. For example, the orchestration engine may determine which clusters will deploy the application.

This aspect of the method 200 may be performed in push and pull modes. In the pull mode, the orchestration engine may communicate directly with each cluster to update or distribute the application. In pull mode, an agent in the cluster may periodically communicate with the orchestration engine to determine if an update is needed.

Deploying 208 the application (e.g., the containers) may occur in one or more clusters in parallel. Further, the rollout may be performed according to the defined methodology, such as Blue Green.

Next, telemetry data from the deployment is captured 210. This may include capturing telemetry data from both the Blue and Green aspects of the deployment. The telemetry data may be transformed to match the format of the test telemetry data. The machine learning model previously trained by the orchestration engine can then be used to determine 212 deployment behavior. Thus, the machine learning model of the orchestration engine may return an output of pass/fail. The machine model may also generate inferences to identify what aspect of the deployment has failed.

For example, a higher amount of protocol exchange in the production deployment compared to the test and historical telemetry data may result in a failed deployment inference.

If the output at 212 is fail, a rollback is performed 214. The orchestration engine may instruct the clusters to perform a rollback operation. If the deployment is successful (Pass at 212) the deployment may continue. For example, the deployment is successful, in one example, only when the operation is deemed acceptable for a period of time.

Thus, if the deployment is successful for a period of time in a cluster or block with live traffic, the deployment can expand to multiple clusters or blocks. If deployment is successful at this stage, deployment may extend to cities as a time or to larger geographic areas simultaneously.

Advantageously, location specific rollback operations can be performed 214. If any local host specific deployment fails during deployment or during expansion of the deployment, the failure can be contained to the failed location. Alternatively, a complete rollback operation could be performed.

Whether the deployment passes or fails, these steps are logged 218 and stored. This allows decisions made by the ML model to be tracked with explainable AI. Further, the logging mechanism may be subject to regulatory and compliance policies. For example, a mission critical rollout may require an immutable ledger to ensure data integrity.

Once the application is successfully rolled out, telemetry data is still collected 220. This allows continuous training to be performed such that the machine model can be improved. During a Blue Green deployment, the portion that is operating normally may generate telemetry data to that effect. Over time, the same deployment plan can be used to reduce effort and improve predictability.

Embodiments of the invention use AI or ML to monitor and detect potential problems that may occur during rollout of an application. When unexpected behavior occurs (for example, large amount of 404 status), the orchestration engine can detect this unexpected behavior using an ML model such as a binary classification ML model and rollback accordingly. Telemetry data are continuously streaming from the production environment to the orchestration engine, so that the ML model can be improved overtime to have higher accuracy. Data integrity for sensitive deployment plans can be ensured using appropriate industry standard logging methods (e.g. immutable ledger).

Without embodiments of the invention, workloads would either be applied blindly across many clusters in parallel, or canary-based deployment is performed, which would take a long time. In the scenario of an unsuccessful rollout, services may be impacted in a large geographic area. With embodiments of the invention, developers can have checks in place with intelligent automation powered by AIML to safe-guard potential rollout failure.

Without embodiments of the invention, machine learning expertise would need to design and train models for the failure detections one at a time. With embodiments of the invention, automated machine learning can be utilized to search for hyperparameters in order to design best pipeline fitting into each location or workload based on historical data.

Embodiments of the invention automate application or software rollout to a large geographical landscape (i.e. a continent) by considering and incorporating geo-specific deployment constraints into the deployment plan and using ML models to monitor, detect and remedy problems in an automated fashion. An application or software is rolled out to different component clusters (centralized components, edge components, etc.) across a topology in an automated manner. Current deployment methods cannot handle the unique requirements of different topologies and are error prone, which requires significant human intervention. Using telemetry data from live traffic to automatically detect, isolate and remedy errors is advantageous. Plus, this allows failed deployments to be rolled back gracefully across multiple component clusters.

Without embodiments of the invention, all deployment will be executed equally across locations that may have different characteristics. With embodiments of the invention, each location and topology component can have their own characteristics taken into account. Furthermore, multiple locations can also be grouped together (for example, at city or state level) to accelerate deployment and reduce management effort.

Deployment plans will have all necessary tests baked in to roll out individual components of a standards based open-source architecture. This is a new concept in telco deployment scenarios and will bring about major benefits for operators in terms of cost through use of off the shelf hardware and specialized software solutions for general compute workloads.

Embodiments can aid in deploying virtualized network functions and edge workloads and can reduce the management and operating challenges.

The following example shows how possible implementations of this invention could behave. Consider the rollout of a Mission Critical Security Patch across North America. Assume that company A is a public 5G service provider that operates in North America. Each of its VNFs and services are deployed with in accordance with embodiments of the invention.

For example, there is an VR service that requires coordination between the cloud, a controller at a central unit (CU), a data plane in a distributed unit (DU), and ML inference at multi-edge computing (MEC). Company A determines that a critical security patch needs to be applied to all VNFs and services located in all 4 components in the topology (CU, DU, MEC, and Cloud).

When using embodiments of the invention, new versions of container images would be uploaded to a container repository after thorough testing. The deployment plan would be preconfigured with human checkpoints to first deploy to one town. The roll out plan can be configured to:
Roll out in one town
Parallelize town rollout for loose population areas
Roll out in a dense population area (like a midsize city)
Parallelize midsize city rollout
Roll out in a highly dense population area (like a major city)
Parallelize major city rollout
Finish rollout across the entire continent All of these rollouts will be automated and checkpoints can be configured according to Company A's policy. If any of the rollout were to fail due to unexpected reasons, rollback can also be automatically configured to avoid service disruption. Furthermore, if the federal government were to regulate the security patch rollout and need to audit the rollout, a centralized immutable deployment log can be provided for logging or audit purposes.

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, data protection operations which may include, but are not limited to, data replication operations, IO replication operations, data read/write/delete operations, data deduplication operations, data backup operations, data restore operations, data cloning operations, data archiving operations, and disaster recovery operations. More generally, the scope of the invention embraces any operating environment in which the disclosed concepts may be useful.

New and/or modified data collected and/or generated in connection with some embodiments, may be stored in a data protection environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter which is operable to service read, write, delete, backup, restore, and/or cloning, operations initiated by one or more clients or other elements of the operating environment. Where a backup comprises groups of data with different respective characteristics, that data may be allocated, and stored, to different respective targets in the storage environment, where the targets each correspond to a data group having one or more particular characteristics.

Example cloud computing environments, which may or may not be public, include storage environments that may provide data protection functionality for one or more clients. Another example of a cloud computing environment is one in which processing, data protection, and other, services may be performed on behalf of one or more clients. Some example cloud computing environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud computing environment.

In addition to the cloud environment, the operating environment may also include one or more clients that are capable of collecting, modifying, and creating, data. As such, a particular client may employ, or otherwise be associated with, one or more instances of each of one or more applications that perform such operations with respect to data. Such clients may comprise physical machines, or virtual machines (VM), or containers. Particularly, devices in the operating environment may take the form of software, physical machines, or VMs, containers, or any combination of these, though no particular device implementation or configuration is required for any embodiment. Similarly, data protection system components such as databases, storage servers, storage volumes (LUNs), storage disks, replication services, backup servers, restore servers, backup clients, and restore clients, for example, may likewise take the form of software, physical machines or virtual machines (VM), or containers, though no particular component implementation is required for any embodiment.

As used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

As used herein, the term 'backup' is intended to be broad in scope. As such, example backups in connection with which embodiments of the invention may be employed include, but are not limited to, full backups, partial backups, clones, snapshots, and incremental or differential backups.

It is noted with respect to the example method of Figure(s) XX that any of the disclosed processes, operations, methods, and/or any portion of any of these, may be performed in response to, as a result of, and/or, based upon, the performance of any preceding process(es), methods, and/or, operations. Correspondingly, performance of one or more processes, for example, may be a predicate or trigger to subsequent performance of one or more additional processes, operations, and/or methods. Thus, for example, the various processes that may make up a method may be linked together or otherwise associated with each other by way of relations such as the examples just noted. Finally, and while it is not required, the individual processes that make up the various example methods disclosed herein are, in some embodiments, performed in the specific sequence recited in those examples. In other embodiments, the individual processes that make up a disclosed method may be performed in a sequence other than the specific sequence recited.

Following are some further example embodiments of the invention. These are presented only by way of example and are not intended to limit the scope of the invention in any way.

Embodiment 1. A method, comprising: deploying an application to a distributed computing environment in accordance with a deployment plan, collecting telemetry data associated with deploying the application to the distributed computing environment, generating an inference from a machine learning model, based on the telemetry data, and expanding the deployment if the inference is successful and rolling back the deployment if the inference is fail.

Embodiment 2. The method of embodiment 1, further comprising testing the application in a testing environment.

Embodiment 2. The method of embodiment 1 and/or 2, further comprising collecting test telemetry data from testing the application and training the machine learning model using the test telemetry data, wherein the test telemetry data and the telemetry data include one or more of runtime traffic data, HTTP request and response codes, resource consumption, resource access, or combination thereof.

Embodiment 4. The method of embodiment 1, 2, and/or 3, further comprising collecting additional telemetry data after the application is successfully deployed and training the machine learning model using the additional telemetry data.

Embodiment 5. The method of embodiment 1, 2, 3, and/or 4, further comprising developing the deployment plan, wherein the development plan includes one or more of multiple containers in a group for distribution, a deployment methodology, tags for deploying certain containers to certain environments, distributing the application incrementally across geographic locations, and human checkpoints.

Embodiment 6. The method of embodiment 1, 2, 3, 4, and/or 5, further comprising distributing the application to multiple clusters in parallel.

Embodiment 7. The method of embodiment 1, 2, 3, 4, 5, and/or 6, wherein the machine learning model is automated machine learning.

Embodiment 8. The method of embodiment 1, 2, 3, 4, 5, 6, and/or 7, wherein a successful deployment for a portion of the deployment plan is based in part on a time period of successful execution.

Embodiment 9. The method of embodiment 1, 2, 3, 4, 5, 6, 7, and/or 8, further comprising logging each deployment step and/or each rollback step.

Embodiment 10. The method of embodiment 1, 2, 3, 4, 5, 6, 7, 8, and/or 9, further comprising logging each deployment step and/or each rollback step based on regulation and/or compliance policies.

Embodiment 11. A method for performing any of the operations, methods, or processes, or any portion of any of these or any combination thereof, disclosed herein or in embodiments 1-10.

Embodiment 12. A non-transitory storage medium having stored therein instructions that are executable by one or more hardware processors to perform operations comprising the operations of any one or more of embodiments 1-11.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 3:
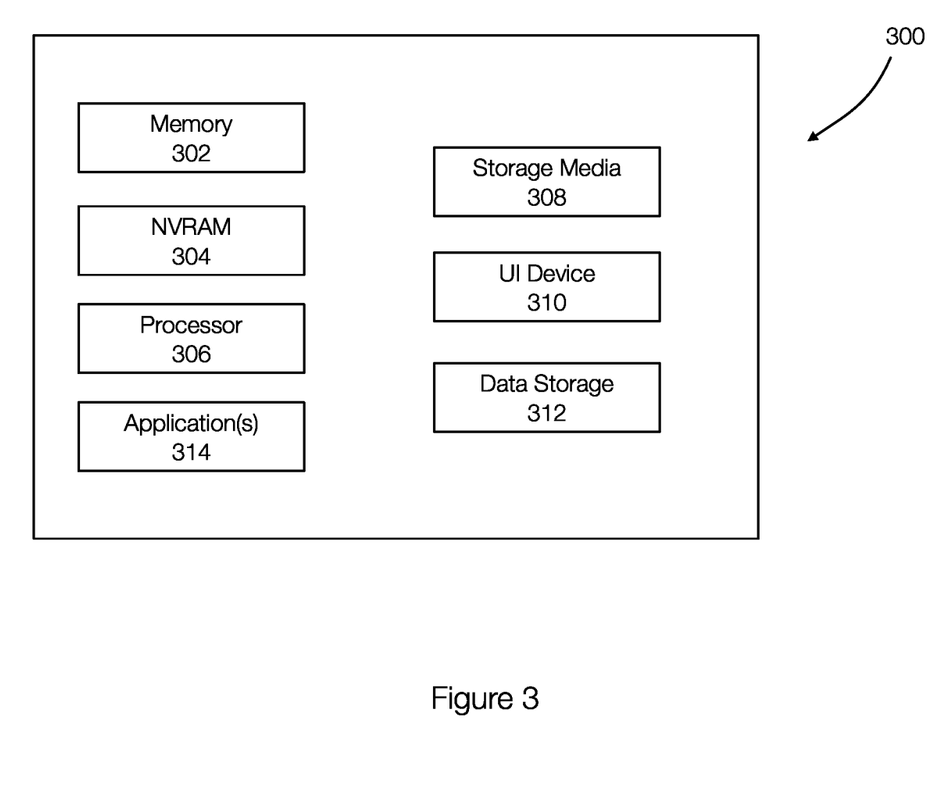
FIG. 3 discloses aspects of a computing system or machine.

With reference briefly now to FIG. 3, any one or more of the entities disclosed, or implied, by the Figures and/or elsewhere herein, may take the form of, or include, or be implemented on, or hosted by, a physical computing device, one example of which is denoted at 300. As well, where any of the aforementioned elements comprise or consist of a virtual machine (VM), that VM may constitute a virtualization of any combination of the physical components disclosed in FIG. 3.

In the example of FIG. 3, the physical computing device 300 includes a memory 302 which may include one, some, or all, of random access memory (RAM), non-volatile memory (NVM) 304 such as NVRAM for example, read-only memory (ROM), and persistent memory, one or more hardware processors 306, non-transitory storage media 308, UI device 310, and data storage 312. One or more of the memory components 302 of the physical computing device 300 may take the form of solid state device (SSD) storage. As well, one or more applications 314 may be provided that comprise instructions executable by one or more hardware processors 306 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
    deploying an application to a distributed computing environment in accordance with a deployment plan;
        collecting test telemetry data and training a machine learning model using the test telemetry data,
        wherein the test telemetry data includes one or more of runtime traffic data, HTTP request and response codes, resource consumption, resource access, or combination thereof;
        collecting telemetry data associated with deploying the application to the distributed computing environment;
        generating an inference from the machine learning model, based on the telemetry data, wherein the inference includes insights on the deployment plan; and
        automatically expanding the deployment if the inference is successful and automatically rolling back the deployment if the inference is fail,
        wherein a successful deployment for a portion of the deployment plan is based in part on a time period of successful execution.

2. The method of claim 1, further comprising testing the application in a testing environment.

3. The method of claim 1, further comprising collecting additional telemetry data after the application is successfully deployed and training the machine learning model using the additional telemetry data.

4. The method of claim 1, further comprising developing the deployment plan, wherein the deployment plan includes one or more of multiple containers in a group for distribution, a deployment methodology, tags for deploying certain containers to certain environments, distributing the application incrementally across geographic locations, and human checkpoints.

5. The method of claim 1, further comprising distributing the application to multiple clusters in parallel.

6. The method of claim 1, wherein the machine learning model is automated machine learning.

7. The method of claim 1, further comprising logging each deployment step and/or each rollback step.

8. The method of claim 1, further comprising logging each deployment step and/or each rollback step based on regulation and/or compliance policies.

9. A non-transitory storage medium having stored therein instructions that are executable by one or more hardware processors to perform operations comprising:
    deploying an application to a distributed computing environment in accordance with a deployment plan;
        collecting test telemetry data and training a machine learning model using the test telemetry data,
        wherein the test telemetry data includes one or more of runtime traffic data, HTTP request and response codes, resource consumption, resource access, or combination thereof;
        collecting telemetry data associated with deploying the application to the distributed computing environment;
        generating an inference from the machine learning model, based on the telemetry data, wherein the inference includes insights on the deployment plan; and automatically expanding the deployment if the inference is successful and automatically rolling back the deployment if the inference is fail,
        wherein a successful deployment for a portion of the deployment plan is based in part on a time period of successful execution.

10. The non-transitory storage medium of claim 9, further comprising testing the application in a testing environment.

11. The non-transitory storage medium of claim 9, further comprising collecting additional telemetry data after the application is successfully deployed and training the machine learning model using the additional telemetry data.

12. The non-transitory storage medium of claim 9, further comprising developing the deployment plan, wherein the deployment plan includes one or more of multiple containers in a group for distribution, a deployment methodology, tags for deploying certain containers to certain environments, distributing the application incrementally across geographic locations, and human checkpoints.

13. The non-transitory storage medium of claim 9, further comprising distributing the application to multiple clusters in parallel.

14. The non-transitory storage medium of claim 9, wherein the machine learning model is automated machine learning.

15. The non-transitory storage medium of claim 9, further comprising logging each deployment step and/or each rollback step.

16. The non-transitory storage medium of claim 9, further comprising logging each deployment step and/or each rollback step based on regulation and/or compliance policies.

\* \* \* \* \*